United States Patent
Ma

(10) Patent No.: US 8,289,967 B2
(45) Date of Patent: Oct. 16, 2012

(54) PACKET FORWARDING METHOD, DEVICE AND SYSTEM

(75) Inventor: Shulei Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 12/696,315

(22) Filed: Jan. 29, 2010

(65) Prior Publication Data

US 2010/0278180 A1    Nov. 4, 2010

(30) Foreign Application Priority Data

Apr. 30, 2009    (CN) .......................... 2009 1 0107028

(51) Int. Cl.
*H04L 12/56*    (2006.01)

(52) U.S. Cl. ... 370/392; 370/230; 370/389; 370/395.53; 709/230

(58) Field of Classification Search .................... None
See application file for complete search history.

(56) References Cited

U.S. PATENT DOCUMENTS

| | | | |
|---|---|---|---|
| 6,757,279 B1 * | 6/2004 | Furlong et al. .............. | 370/387 |
| 6,829,651 B1 | 12/2004 | Bass et al. | |
| 2006/0251085 A1 * | 11/2006 | Kalkunte et al. ............. | 370/400 |
| 2007/0268915 A1 | 11/2007 | Zelig et al. | |
| 2008/0008182 A1 | 1/2008 | Deng | |

FOREIGN PATENT DOCUMENTS

| | | |
|---|---|---|
| CN | 1809032 A | 7/2006 |
| CN | 1829190 A | 9/2006 |
| CN | 101056267 A | 10/2007 |

OTHER PUBLICATIONS

1st Office Action in corresponding Chinese Application No. 200910107028.4 (Aug. 3, 2011).

* cited by examiner

*Primary Examiner* — Ayaz Sheikh
*Assistant Examiner* — Nicholas Sloms
(74) *Attorney, Agent, or Firm* — Leydig, Voit & Mayer, Ltd.

(57) ABSTRACT

A packet forwarding method, a packet forwarding device, and a packet forwarding system are provided. The method includes: acquiring, by a first board, a source media access control (MAC) address and an input port number in a packet, and looking up a MAC address table according to the source MAC address; learning the source MAC address if no same entry is found; and looking up a forwarding policy table according to the input port number to acquire a forwarding policy, and sending the packet to a second board according to the forwarding policy, so that the second board learns the source MAC address to realize synchronization of MAC addresses. The synchronization of MAC addresses is realized by acquiring the forwarding policy without changing a current forwarding process or influencing an execution efficiency of a central processing unit (CPU).

12 Claims, 3 Drawing Sheets

PACKET FORWARDING METHOD, DEVICE AND SYSTEM

CROSS-REFERENCE TO RELATED APPLICATION

This application claims priority to Chinese Patent Application No. 200910107028.4, filed on Apr. 30, 2009, which is hereby incorporated by reference in its entirety.

FIELD OF THE TECHNOLOGY

The present invention relates to the field of communications, and more particularly to a packet forwarding method, a packet forwarding device, and a packet forwarding system.

BACKGROUND OF THE INVENTION

As specified in IEEE802.3, a standard Ethernet Media Access Control (MAC) frame includes a destination MAC address and a source MAC address, which both have a length of 6 bytes. The destination MAC address identifies physical equipment where an Ethernet frame is sent, and the source MAC address identifies physical equipment that sends the Ethernet frame. The first bit (the lowest bit of the first byte) of the destination MAC address indicates whether the destination MAC address is a unicast address or a multicast address, in which 0 represents a unicast address and 1 represents a multicast address. If all bits of the destination MAC address are 1, it indicates a broadcast MAC address, and the Ethernet MAC frame with the broadcast MAC address is forwarded to all physical equipment of a corresponding network.

After receiving the Ethernet MAC frame, the equipment adds corresponding forwarding entries, and records the source MAC address, a virtual local area network (VLAN) identifier (VLAN ID), and an input port number of the Ethernet MAC frame, which is called learning the MAC address.

In order to expand the port or bandwidth, the same equipments will be connected together to act as one equipment, which is called cascade connection. Ports for connecting cascaded equipments are called cascade ports or interconnection ports.

IEEE 802.3ad specifies a manner for realizing link aggregation. Specifically, two or more physical ports are bound together to act as one logical port, which achieves the functions of load sharing and link protection. The logical port is called a link-aggregation group. The load sharing refers to sending a packet via different physical ports in the link-aggregation group according to a specific aggregation routing algorithm, for example, according to a destination MAC address or a source MAC address in the packet. The link protection refers that, when a certain physical port in the link-aggregation group fails, a packet that originally plans to be sent via the physical port is automatically sent via another physical port in the link aggregation group.

As shown in FIG. 1, the cascade connection of a plurality of equipments or interconnection of boards on the same equipment includes a first board 100, a second board 110, and a switch board 120. The first board 100 includes an input port, port 1, an output port, port 3, and a cascade port, port 22. The second board 110 includes a port, port 4. Port 22 is adapted to connect the second board 110 to realize the cascade connection between the first board 100 and the second board 110 and the aggregation of port 3 and port 4. The first board 100 receives an Ethernet MAC frame from the switch board 120 via port 1, and possibly selects port 3 to forward the received Ethernet MAC frame according to an aggregation algorithm in consideration of the aggregation of port 3 and port 4. Thus, the second board 110 cannot learn a source MAC address of the Ethernet MAC frame. As a result, after receiving the Ethernet MAC frame sent to the switch board 120 via port 4, the second board 110 broadcasts the frame all the time. In order to solve this problem, the synchronization of MAC addresses is required. Nowadays, the commonly adopted manner is to use a central processing unit (CPU) to realize the synchronization of MAC addresses. Specifically, the CPU on the first board 100 periodically reads all MAC addresses in the MAC address table, encapsulates the MAC addresses into a data segment of the Ethernet MAC frame, and sends the Ethernet MAC frame to the second board 110. After receiving the Ethernet packet, the second board 110 reads the MAC addresses requiring synchronization from the data segment of the Ethernet MAC frame, and configures the MAC addresses into the MAC address table of this board.

However, when the CPU is adapted to realize the synchronization of MAC addresses, since generally a large number of MAC addresses exist and usually reach over 16 k, a large amount of CPU resources are occupied and the processing performance of the CPU is influenced. Meanwhile, the CPU synchronizes the MAC addresses according to a certain cycle. If the synchronization is not performed in time, data packets may possibly be broadcasted within a specific time period, thereby influencing the processing performance of the network.

SUMMARY OF THE INVENTION

The present invention is directed to a packet forwarding method, a packet forwarding device, and a packet forwarding system, which are applicable to solve problems about synchronization of MAC addresses among cross-board link aggregation boards/equipments, or cascaded boards/equipments.

In an embodiment, the present invention provides a packet forwarding method, which including the following steps.

A packet from a switch board is received.

An input port number of the packet is acquired, and a forwarding policy table storing corresponding relations among the input port number, an output port number and a cascade port number is looked up according to the input port number, so as to acquire the output port number and the cascade port number corresponding to the input port number.

The packet is forwarded to a cascade board via a port corresponding to the cascade port number, so that the cascade board learns a source MAC address of the packet; and the packet is forwarded to a port corresponding to the output port number.

In an embodiment, the present invention provides a board, which includes a storage unit, a receiving unit, a processing unit, and a sending unit.

The storage unit is adapted to store a forwarding policy table, where the forwarding policy table stores corresponding relations among an input port number, an output port number and a cascade port number.

The receiving unit is adapted to receive a packet from a switch board and acquire an input port number of the packet.

The processing unit is adapted to look up the forwarding policy table according to the input port number, and acquire the output port number and the cascade port number corresponding to the input port number.

The sending unit is adapted to forward the packet to a cascade board via a port corresponding to the cascade port number, so that the cascade board learns a source MAC address of the packet, and forward the packet to a port corresponding to the output port number.

In an embodiment, the present invention provides a packet forwarding system, which includes a first board and a second board.

The first board includes a forwarding policy table, where the forwarding policy table stores corresponding relations among an input port number, an output port number and a cascade port number.

After receiving a packet from a switch board, the first board acquires an input port number of the packet, looks up the forwarding policy table according to the input port number, acquires the output port number and the cascade port number corresponding to the input port number, and forwards the packet to the second board via a port corresponding to the cascade port number, so that the second board learns a source MAC address of the packet; and the packet is forwarded to a port corresponding to the output port number.

The packet forwarding method, the packet forwarding device, and the packet forwarding system provided in the embodiments of the present invention have the following advantages and beneficial effects. After acquiring a packet, a board/equipment forwards the packet to a cascade board or a cross-board link aggregation board according to a forwarding policy, which does not influence the execution efficiency of a CPU, and does not need to synchronize the content of the whole MAC address table.

DETAILED DESCRIPTION OF THE EMBODIMENTS

The present invention is described below with reference to the accompanying drawings.

Figure 2:
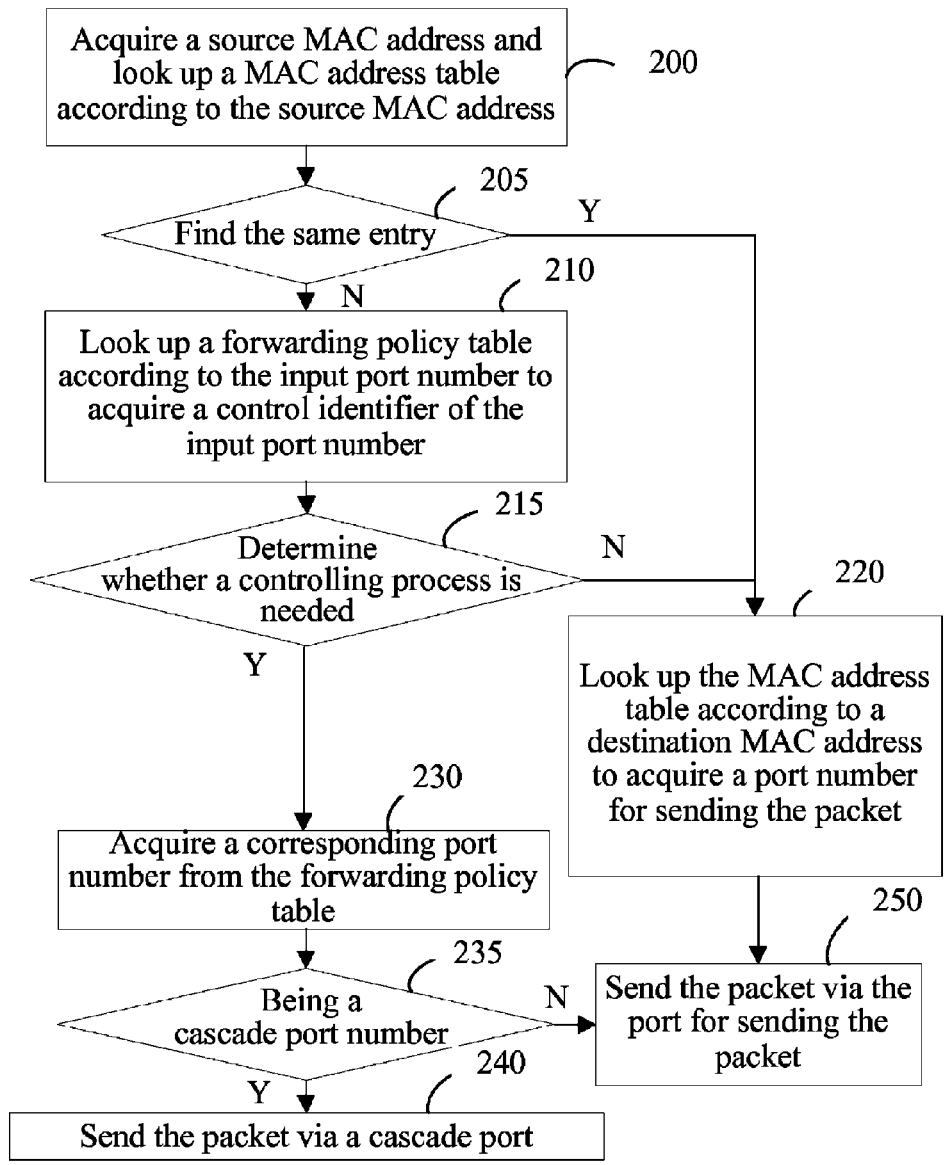
FIG. 2 is a flow chart of a packet forwarding method according to an embodiment of the present invention.

A first embodiment of the present invention provides a packet forwarding method, which involves a first board and a second board. The first board and the second board may belong to the same equipment or belong to different cascaded equipments. The first board and the second board may be aggregated or cascaded through IEEE 802.3ad. As shown in FIG. 2, the packet forwarding method includes the following specific steps.

In step 200, the first board receives a packet (Ethernet packet or another Ethernet MAC frame), acquires a source MAC address from the packet, and looks up a MAC address table according to the source MAC address, and then the process proceeds to step 205.

In step 205, if the MAC address table records the source MAC address and the corresponding port number is consistent with an input port number, the process proceeds to step 220; otherwise, the source MAC address is learned, and the process proceeds to step 210.

The learning the source MAC address includes the following sub-steps:

(1) If the MAC address table does not have the source MAC address, the source MAC address, VLAN ID, and input port number are added to the MAC address table as an entry.

(2) If the MAC address table has the source MAC address, but the corresponding port number is different from the input port number, the port number corresponding to the source MAC address in the MAC address table is updated to the input port number.

In step 210, a forwarding policy table is looked up according to the input port number, so as to acquire a control identifier of the input port number.

The forwarding policy table may be an independent table or may be nested in another table, which is adapted to reflect corresponding relations among the input port number, the output port number and the cascade port number. The structure of the forwarding policy table is as shown in Table 1. Persons of ordinary skill in the art can know that, a cascade port can be adapted to transmit a packet between cascade boards. Therefore, when the cascade port is adapted to receive a packet, the cascade port is equivalent to an input port; and when the cascade port is adapted to send a packet, the cascade port is equivalent to an output port. In Table 1, a "packet input port bitmap" includes a cascade port on a board, and a "packet output port bitmap" may also include a cascade port on a board.

TABLE 1

| Packet input port bitmap | VLAN broadcast enabled/disabled | Packet output port bitmap |
| --- | --- | --- |

The fields in the table are respectively described as follows.

(1) "Packet input port bitmap" indicates that the forwarding control needs to be performed on packets entering via which ports. All ports on the board fall within this range, and each port occupies one bit. If a bit corresponding to a port is True, it indicates that packets entering via this port need to be controlled, and if the corresponding bit is False, packets entering via this port do not need to be controlled. This field is valid for a plurality of ports at the same time. In the following embodiments, a bit being True is identified as "1", and a bit being False is identified as "0".

(2) "VLAN broadcast enabled/disabled" indicates whether the packet needs to be sent to all ports of the current VLAN. If it is True, the "packet output port bitmap" is invalid. Preferably, the value of "VLAN broadcast enabled/disabled" is set as True when VLAN broadcast is enabled, and it is False when VLAN broadcast is disabled.

(3) Packet output port bitmap is adapted to designate a port number for forwarding a packet when the "VLAN broadcast enabled/disabled" is False. All ports on the board fall within this range, and each port occupies one bit. If a bit corresponding to one port is 1, it indicates that the packet is forwarded via this port, and the packet may be designated to be forwarded via one or more ports.

In step 215, the "packet input port bitmap" in the forwarding policy table is looked up according to the input port number, so as to acquire a control identifier of the input port number. If the corresponding bit is "1", it indicates that the input port needs to be controlled, and the process proceeds to step 230. If the corresponding bit is "0", it indicates that the input port does not need to be controlled, and the process proceeds to step 220.

In step 220, the MAC address table is looked up according to a destination MAC address, so as to acquire a port number for sending the packet.

The destination MAC address in the packet is extracted, the MAC address table is looked up according to the destination MAC address, a port number corresponding to the destination MAC address is acquired from the MAC address table to serve as an output port number, and the process proceeds to step 250.

In step 230, the forwarding policy table is looked up according to the input port number, so as to acquire a corresponding port number to serve as a port number for sending the packet.

The value of the "VLAN broadcast enabled/disabled" in the forwarding policy table corresponding to the input port number is acquired. If the "VLAN broadcast enabled/disabled" is True, a VLAN table is looked up, so as to acquire all port numbers in the VLAN to serve as the port numbers for sending the packet. If the "VLAN broadcast enabled/disabled" is identified as False, the port number in the corresponding "Packet output port bitmap" field in the forwarding policy table is acquired to serve as the port number for sending the packet.

In step 235, the port number for sending the packet includes a cascade port number and/or an output port number. If the port number is the cascade port number, the process proceeds to step 240; and if the port number is the output port number, the process proceeds to step 250.

In step 240, the packet is sent via a port corresponding to the cascade port number.

If the port number for sending the packet is the cascade port number, the packet is sent to the second board via a port corresponding to the cascade port number, so that the second board learns the source MAC address in the packet after receiving the packet. Thus, the content in the MAC address table on the second board is synchronized with the content in the MAC address table on the first board.

In step 250, the packet is sent according to the output port number.

If the output port number is a port number in an aggregation group, at least one port is selected from the aggregation group according to a set aggregation algorithm to send the packet, or VLAN switching or Layer 3 forwarding is performed. The process in the prior art may be referred to for details.

If the output port number is not a port number in the aggregation group, the packet is sent via a port corresponding to the output port number, or VLAN switching or Layer 3 forwarding is performed.

Figure 1:
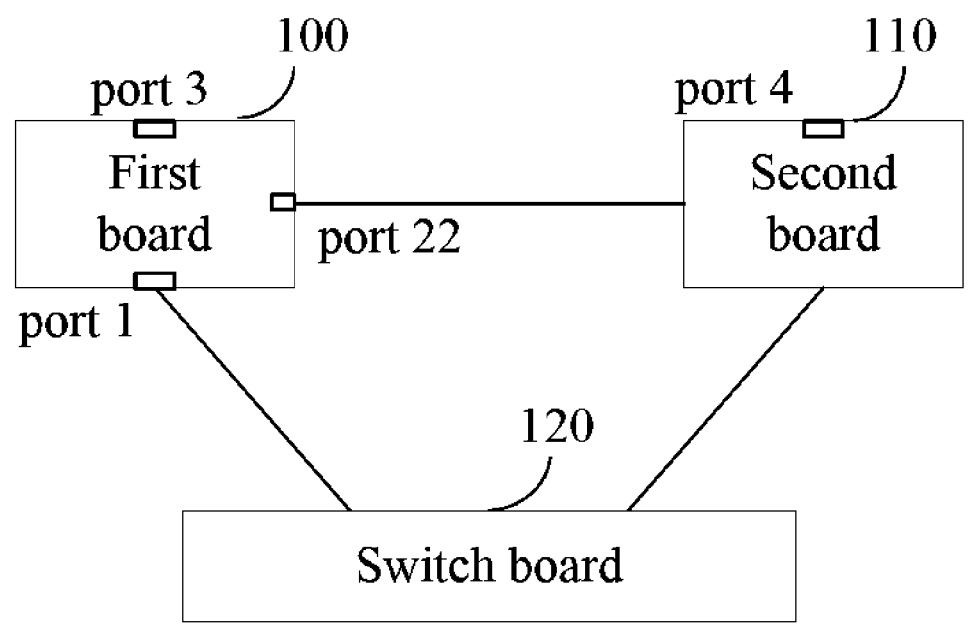
FIG. 1 is a schematic view of aggregation of boards in the prior art.

In an embodiment about how to select a port for sending a packet according to the forwarding policy table, as shown in FIG. 1, a first board 100 receives a packet from port 1, and looks up a forwarding policy table on the first board 100, and if "VLAN broadcast enabled/disabled" corresponding to port 1 is False, an output port number for sending the packet needs to be acquired according to "Packet output port bitmap" in the forwarding policy table.

The schematic view of the forwarding policy table is shown in Table 2. Persons of ordinary skill in the art can know that, in fact, preferably, the bits corresponding to port 1 and port 22 in the input port bitmap field are "1", and in the corresponding output port bitmap, the bits corresponding to port 3 and port 22 are "1".

TABLE 2

| port1 + port22 | VLAN broadcast disable | port22 + port3 |
|---|---|---|

As indicated in the table, a packet received via port 1 and port 22 needs to be sent via port 22 and port 3, and a packet received via port 22 does not need to be sent to port 22. Therefore, as known by looking up the forwarding policy table, the packet received via the port1 needs to be sent to port 22 and port 3. As known by looking up the MAC address table, port 22 is a cascade port number. Therefore, the packet is sent to a second board 110 via port 22, so that the second board 110 learns a source MAC address in the packet. Port 3 and port 4 are set to be aggregated with each other. Accordingly, the first board 100 selects one port from port 3 and port 4 according to an aggregation algorithm to send the packet. The process in the prior art may be referred to about how to select a port according to the aggregation algorithm to send a packet.

The packet forwarding method provided in this embodiment realizes synchronization of MAC addresses between cascade boards and solves the problems that, when ports of a plurality of boards are aggregated and one port on one board is selected to send a packet according to the aggregation algorithm, the other cascade boards cannot learn the source MAC address and the MAC addresses cannot be synchronized. If the packet enters via a cascade port, a cascade mark is set for the source MAC address in the MAC address table when the MAC address is learned. After an aging period of the MAC address expires, the board reads MAC addresses without any cascade mark, and notifies the other cascade boards about the MAC addresses, so that the other cascade boards delete the MAC addresses synchronously.

In this embodiment, the forwarding policy is set, and the packet is forwarded to the cascade board/cascaded equipment via the cascade port according to the forwarding policy, thereby realizing synchronization of MAC addresses, without influencing the existing forwarding process or the processing performance of the CPU.

Figure 3:
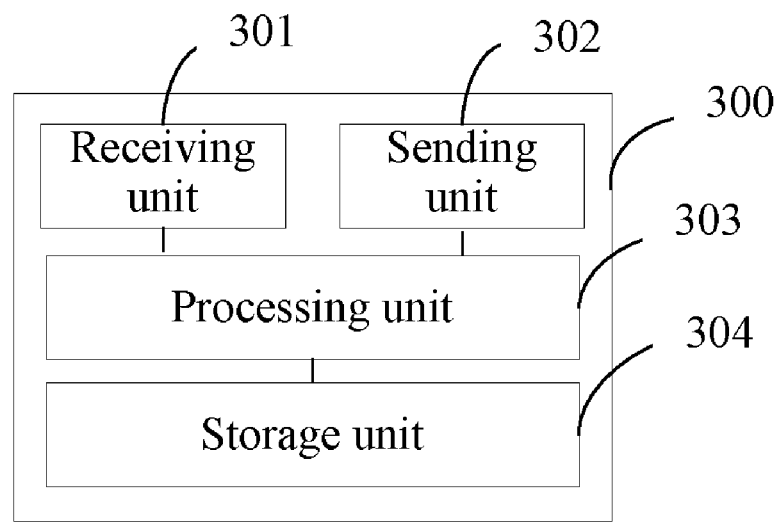
FIG. 3 is a schematic structural view of a board according to an embodiment of the present invention.
Figure 4:
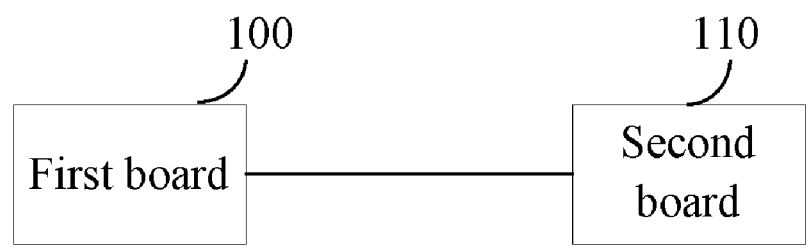
FIG. 4 is a schematic view of a packet forwarding system according to an embodiment of the present invention.

The second embodiment of the present invention provides a board, as shown in FIG. 3. A board 300 includes a receiving unit 301, a sending unit 302, a processing unit 303, and a storage unit 304.

The storage unit 304 stores a forwarding policy table. The forwarding policy table stores corresponding relations among an input port number, an output port number and a cascade port number, and includes a "packet input port bitmap", a "VLAN broadcast enabled/disabled", and a "packet output port bitmap". The "packet input port bitmap" is adapted to store a control identifier of a port on the board, and when the control identifier corresponding to the port number is True, it indicates that the forwarding control needs to be performed on the port corresponding to the port number.

The storage unit 304 is further adapted to store a MAC address table, and the MAC address table is shown in Table 3.

TABLE 3

| MAC address | VLAN ID | Port number | Status |
|---|---|---|---|

The receiving unit 301 is adapted to receive a packet from a switch board.

The processing unit 303 is adapted to acquire a source MAC address from the packet received by the receiving unit 301, look up the MAC address table according to the source MAC address, and add the source MAC address to the MAC address table, if no same entry is found.

The "Packet input port bitmap" in the forwarding policy table is looked up according to an input port number, so as to acquire the value of the "VLAN broadcast enabled/disabled" in the forwarding policy table corresponding to the input port number. If the "VLAN broadcast enabled/disabled" is True, a VLAN table is looked up, so as to acquire all port numbers in the VLAN to serve as the port numbers for sending a packet. If the "VLAN broadcast enabled/disabled" is identified as False, a port number of the corresponding output port bitmap field in the forwarding policy table is acquired to serve as the port number for sending the packet.

The sending unit 302 is adapted to send the packet according to the port number for sending the packet acquired by the processing unit 303.

The port number for sending the packet acquired by the processing unit 303 includes a cascade port number and an output port number. If it is a cascade port number, the sending unit 302 sends the packet to a cascade board via a cascade port corresponding to the cascade port number.

The processing unit 303 further needs to determine whether the output port number is a port number in an aggregation group. If the output port number is a port number in the aggregation group, at least one port is selected from the aggregation group according to a set aggregation algorithm, and then the sending unit 302 is notified to send the packet via the selected port, or VLAN switching or Layer 3 forwarding is performed. If the output port number is not a port number in the aggregation group, the sending unit 302 is notified to send the packet via a port corresponding to the output port number, or VLAN switching or Layer 3 forwarding is performed. The process in the prior art may be referred to for details.

The board in this embodiment can be applied in communication equipment. The communication equipment may be a digital subscriber line access multiplexer (DSLAM), an optical line terminal (OLT), an optical network unit (ONU), or a switch.

The board in this embodiment receives the packet, looks up the forwarding policy table, sends the packet according to the corresponding relations among the input port number, the output port number and the cascade port number, acquires the cascade port corresponding to the input port number, and sends the packet to the cascaded equipment via the cascade port, thereby realizing synchronization of MAC addresses.

The third embodiment of the present invention provides a packet forwarding system, which includes a first board 100 and a second board 110. The first board 100 and the second board 110 may be two boards in one communication equipment, or may belong to two different communication equipments. The first board 100 and the second board 110 are connected via a cascade port.

The first board 100 includes a forwarding policy table. The forwarding policy table stores corresponding relations among an input port number, an output port number and a cascade port number, and the structure thereof is shown in Table 1.

The first board 100 receives a packet from a switch board, acquires an input port number of the packet, looks up the forwarding policy table according to the input port number, and acquires an output port number and a cascade port number corresponding to the input port number. The process of acquiring the cascade port and the output port number from the forwarding policy table may be obtained with reference to the first embodiment.

The first board 100 forwards the packet to the second board 110 via a port corresponding to the cascade port number, so that the second board 110 learns a source MAC address of the packet.

If the acquired output port number is a port number in an aggregation group, the first board 100 selects at least one port for sending the packet from the aggregation group according to an aggregation algorithm, or performs VLAN switching or Layer 3 forwarding. The process in the prior art may be referred to for details.

If the output port number is not a port number in the aggregation group, the first board 100 sends the packet via a port corresponding to the output port number, or performs VLAN switching or Layer 3 forwarding.

The packet forwarding system in this embodiment forwards the packet according to the set forwarding policy. The forwarding policy reflects corresponding relations among the input port number, the output port number and the cascade port number. The forwarding policy table is looked up to acquire the corresponding cascade port number according to the input port number, and then the packet is sent via a corresponding cascade port. Accordingly, the cascaded equipments may also learn the source MAC address in the packet, thereby realizing synchronization of MAC addresses among cascaded equipments, and it is unnecessary to encapsulate and send all the MAC addresses in the MAC address table to the cascaded equipments to realize synchronization of MAC addresses.

Persons of ordinary skill in the art may understand that all or part of the steps in the preceding embodiments may be performed on hardware by following instructions of a program. The program may be stored in a computer readable storage medium such as a Read-Only Memory (ROM), a Random Access Memory (RAM), a magnetic disk, or a compact disk.

It is apparent that those skilled in the art can make various modifications and variations to the invention without departing from the spirit and scope of the invention. In this case, the invention shall cover the modifications and variations provided that they fall in the scope of protection defined by the appended claims or their equivalents.

What is claimed is:

1. A packet forwarding method, comprising:
receiving a packet from a switch board;
acquiring an input port number of the packet, looking up a forwarding policy table to acquire an output port number and a cascade port number corresponding to the input port number;
forwarding the packet to a cascade board via a port corresponding to the cascade port number; and
forwarding the packet to a port corresponding to the output port number;
wherein the forwarding policy table comprises a "packet input port bitmap", a Virtual Local Area Network (VLAN) broadcast enabled/disabled, and a "packet output port bitmap", the "packet input port bitmap" stores the input port number, and the "packet output port bitmap" stores the output port number and the cascade port number corresponding to the input port number;
wherein the looking up the forwarding policy table to acquire the output port number and the cascade port number corresponding to the input port number comprises:
looking up the "packet input port bitmap" according to the input port number to acquire a control identifier of the input port number; and
looking up the corresponding "packet output port bitmap", if the control identifier of the input port number is True and the corresponding "VLAN broadcast enabled/disabled" is False, and acquiring the corresponding output port number and the corresponding cascade port number.

2. The method according to claim 1, wherein the looking up the forwarding policy table to acquire the output port number and the cascade port number corresponding to the input port number further comprises:
acquiring a VLAN identifier in the packet, if the control identifier of the input port number is True and the corresponding "VLAN broadcast enabled/disabled" is True, and looking up a VLAN table according to the VLAN identifier and acquiring the corresponding output port number and the corresponding cascade port number.

3. The method according to claim 1, further comprising:
selecting at least one port from an aggregation group according to an aggregation algorithm to send the packet, or performing VLAN switching or Layer 3 forwarding, if the output port number is a port number in the aggregation group; and
sending the packet via a port corresponding to the output port number or performing VLAN switching or Layer 3 forwarding, if the output port number is not a port number in the aggregation group.

4. The method according to claim 1, further comprising:
selecting at least one port from an aggregation group according to an aggregation algorithm to send the packet, or performing VLAN switching or Layer 3 forwarding, if the output port number is a port number in the aggregation group; and
sending the packet via a port corresponding to the output port number or performing VLAN switching or Layer 3 forwarding, if the output port number is not a port number in the aggregation group.

5. The method according to claim 2, further comprising:
selecting at least one port from an aggregation group according to an aggregation algorithm to send the packet, or performing VLAN switching or Layer 3 forwarding, if the output port number is a port number in the aggregation group; and
sending the packet via a port corresponding to the output port number or performing VLAN switching or Layer 3 forwarding, if the output port number is not a port number in the aggregation group.

6. A board, comprising:
a storage unit, configured to store a forwarding policy table
a receiving unit, configured to receive a packet from a switch board, and acquire an input port number of the packet;
a processing unit, configured to look up the forwarding policy table according to the input port number, and acquire an output port number and a cascade port number corresponding to the input port number; and
a sending unit, configured to forward the packet to a cascade board via a port corresponding to the cascade port number, and forward the packet to a port corresponding to the output port number;
wherein the forwarding policy table comprises a "packet input port bitmap", a Virtual Local Area Network VLAN broadcast enabled/disabled and a "packet output port bitmap", the "packet input port bitmap" stores the input port number, and the "packet output port bitmap" stores the output port number and the cascade port number corresponding to the input port number;
wherein the processing unit is further configured to look up the "packet input port bitmap" according to the input port number to acquire a control identifier of the input port number; look up the corresponding "packet output port bitmap", if the control identifier of the input port number is True and the corresponding "VLAN broadcast enabled/disabled" is False, and acquire the corresponding output port number and the corresponding cascade port number.

7. The board according to claim 6, wherein the processing unit is further adapted to determine whether the output port number is a port number in the aggregation group,
if the output port number is a port number in the aggregation group, VLAN switching or Layer 3 forwarding is performed, or at least one port number is selected from the aggregation group according to an aggregation algorithm, and the sending unit is notified to send the packet via a port corresponding to the at least one port number; and
if the output port number is not a port number in the aggregation group, VLAN switching or Layer 3 forwarding is performed, or the sending unit is notified to send the packet via a port corresponding to the output port number.

8. The board according to claim 6, wherein the board is applied in communication equipment, and the communication equipment comprises a digital subscriber line access multiplexer (DSLAM), an optical line terminal (OLT), an optical network unit (ONU), or a switch.

9. The board according to claim 6, wherein the board is applied in communication equipment, and the communication equipment comprises a digital subscriber line access multiplexer (DSLAM), an optical line terminal (OLT), an optical network unit (ONU), or a switch.

10. The board according to claim 7, wherein the board is applied in communication equipment, and the communication equipment comprises a digital subscriber line access multiplexer (DSLAM), an optical line terminal (OLT), an optical network unit (ONU), or a switch.

11. A packet forwarding system, comprising: a first board and a second board, wherein the first board comprises a forwarding policy table,
the first board receives a packet from a switch board, acquires an input port number of the packet, looks up the forwarding policy table to acquire an output port number and a cascade port number corresponding to the input port number, and forwards the packet to the second board via a port corresponding to the cascade port number; and the packet is forwarded to a port corresponding to the output port number;
wherein the forwarding policy table comprises a "packet input port bitmap", a Virtual Local Area Network VLAN broadcast enabled/disabled, and a "packet output port bitmap", the "packet input port bitmap" stores the input port number, and the "packet output port bitmap" stores the output port number and the cascade port number corresponding to the input port number;
wherein the first board is further configured to look up the "packet input port bitmap" according to the input port number to acquire a control identifier of the input port number; look up the corresponding "packet output port bitmap", if the control identifier of the input port number is True and the corresponding "VLAN broadcast enabled/disabled" is False, and acquire the corresponding output port number and the corresponding cascade port number.

12. The system according to claim 11, wherein the first board and the second board belong to one communication equipment, or belong to different communication equipments.

* * * * *